United States Patent
Zugenmaier et al.

(10) Patent No.: US 8,713,675 B2
(45) Date of Patent: Apr. 29, 2014

(54) METHOD AND APPARATUS FOR THE PREVENTION OF A SERVICE DEGRADATION ATTACK

(75) Inventors: Alf Zugenmaier, Munich (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 200 days.

(21) Appl. No.: 13/044,089

(22) Filed: Mar. 9, 2011

(65) Prior Publication Data
US 2011/0258699 A1 Oct. 20, 2011

(30) Foreign Application Priority Data

Mar. 10, 2010 (EP) .................................... 10156074

(51) Int. Cl.
*G06F 11/00* (2006.01)

(52) U.S. Cl.
USPC .................... 726/22; 726/23; 726/24; 726/25

(58) Field of Classification Search
None
See application file for complete search history.

(56) References Cited

U.S. PATENT DOCUMENTS

| | | | | |
|---|---|---|---|---|
| 5,940,439 A | * | 8/1999 | Kleider et al. | 375/225 |
| 6,597,923 B1 | * | 7/2003 | Vanghi et al. | 455/522 |
| 6,625,179 B1 | * | 9/2003 | Doetsch et al. | 370/529 |
| 6,980,602 B1 | * | 12/2005 | Kleinerman et al. | 375/262 |
| 2002/0054578 A1 | * | 5/2002 | Zhang et al. | 370/328 |
| 2003/0128658 A1 | * | 7/2003 | Walton et al. | 370/208 |
| 2004/0057468 A1 | * | 3/2004 | Shieh et al. | 370/514 |
| 2005/0025223 A1 | * | 2/2005 | Dabak et al. | 375/147 |
| 2005/0037733 A1 | * | 2/2005 | Coleman et al. | 455/411 |
| 2006/0136798 A1 | * | 6/2006 | Domagala et al. | 714/752 |
| 2006/0200862 A1 | * | 9/2006 | Olson et al. | 726/23 |
| 2006/0256966 A1 | * | 11/2006 | Kuang et al. | 380/256 |
| 2007/0049207 A1 | * | 3/2007 | Haghighat et al. | 455/69 |
| 2007/0133798 A1 | * | 6/2007 | Elliott | 380/255 |
| 2008/0012764 A1 | * | 1/2008 | Kang et al. | 342/367 |
| 2009/0059844 A1 | | 3/2009 | Ko et al. | |
| 2010/0131751 A1 | * | 5/2010 | Reznik et al. | 713/151 |

FOREIGN PATENT DOCUMENTS

| | | |
|---|---|---|
| WO | 2007-051154 A2 | 5/2007 |
| WO | 2010-006035 A2 | 1/2010 |

OTHER PUBLICATIONS

Han et al. "Distributed Cooperative Transmission with Unreliable and Untrustworthy Relay Channels ", Dec. 21, 2009, EURASIP Journal on Wireless Communications and Networking 2009.*

* cited by examiner

*Primary Examiner* — Cordelia Zecher
*Assistant Examiner* — Trang Doan
(74) *Attorney, Agent, or Firm* — Nutter McClennen & Fish LLP; John J. Penny, Jr.; Christina M. Sperry (57) ABSTRACT

In a wireless communication system where the data transmission is optimized with respect to the channel state information fed back by the users, a service degradation attack can be made by feeding back faked channel state information. A method for preventing a service degradation attack on a first wireless communication device by a second wireless communication device in a wireless communication system, said method comprising: verifying by a base station whether the channel state information sent to the base station by the second wireless communication device corresponds to its real channel.

15 Claims, 4 Drawing Sheets

METHOD AND APPARATUS FOR THE PREVENTION OF A SERVICE DEGRADATION ATTACK

FIELD OF THE INVENTION

The present invention relates to a method and an apparatus for the prevention of a service degradation attack.

In particular, the present invention relates to a mechanism for the prevention of intentional performance degradation.

BACKGROUND OF THE INVENTION

In a wireless communication system, a base station normally communicates with multiple users that are attached to it. The base station transmits data to the individual users by scheduling them on the available radio resources such as time slots and frequency bands.

The achievable data rate of a certain user on a certain radio resource depends on the channel of that user on that radio resource. As the radio channel generally varies over time and frequency, it is well-known that the system performance can be greatly improved by scheduling the users according to the channel state information, called dynamic scheduling or adaptive resource allocation.

When the channel state information is available at the transmitter, i.e. the base station, the base station may always schedule the radio resources to the user that has the best channel quality such that the system performance in terms of system data throughput is maximized. This is normally referred to as maximum rate scheduler.

The channel state information is usually provided to the transmitter from the receiver through channel feedback. That is, each user feeds back his channel state information to the base station.

This information which is fed back can be used by an attacker. Hence, an attacker can feed back arbitrary channel state information from an attack user terminal to the base station. For example, the attacker may claim that he always has very good channel, and so the base station that tries to maximize the system data throughput will schedule the attacker much more frequently than other users. Consequently, the other users are scheduled less frequently, resulting in performance degradation.

Different from the maximum rate scheduler, proportional fair scheduler weights the channel qualities of a user on individual radio resources by the average channel quality of that user. Thus, the proportional fair scheduler provides certain fairness among users. However, it only reduces the impact of the attacker but cannot completely prevent the attack.

Furthermore, the attack not only has a negative effect on the user side but also for the operator whose intent usually is to maximize the billing. However, the data throughput is not billed until the receiver acknowledges the successful reception of the data. The attacker could then just avoid the billing by not using the resources which the base station schedules to him. As a result, the billable data throughput is not maximized.

Multiple-input and multiple-output (MIMO) is a technology of using multiple antennas at transmitter and receiver to improve communication performance by utilizing the spatial dimension.

When the base station is equipped with multiple antennas, more than one user can be scheduled simultaneously, i.e. on the same time-frequency resource, and separated in spatial domain, which is known as spatial division multiple access.

When the channel state information is available at the transmitter, i.e. the base station, the performance can be largely improved by using precoding. In precoding, the simultaneous data streams are transmitted with different and appropriate precoder, e.g. antenna weighting vectors, such that the performance such as data throughput is maximized. Generally speaking, when more than one user are simultaneously scheduled, the precoder of each data stream is properly selected to maximize the signal level to the dedicated user and minimize the interference level to the other users.

If two users have similar channels, e.g. their channel spatial correlation is similar, e.g. the spatial correlation between the two users is high or the two users have a similar eigenspace of the channel correlation matrix, a data stream with the precoder that maximizes the signal level to one user necessarily generates high interference to the other. Therefore, it is preferred not to simultaneously schedule these two users.

Hence, the attacker can affect the performance of a particular user, called victim hereafter, by pretending to have a channel which has maximum interference at the victim. For example, the attacker may feed back the same channel state information as the victim. The attacker may get the channel state information of the victim by using the location data of the victim and calculating an estimation of his channel state information based on radio planning tools or measurement data look-up tables, or by overhearing the feedback channel of the victim.

Figure 1:
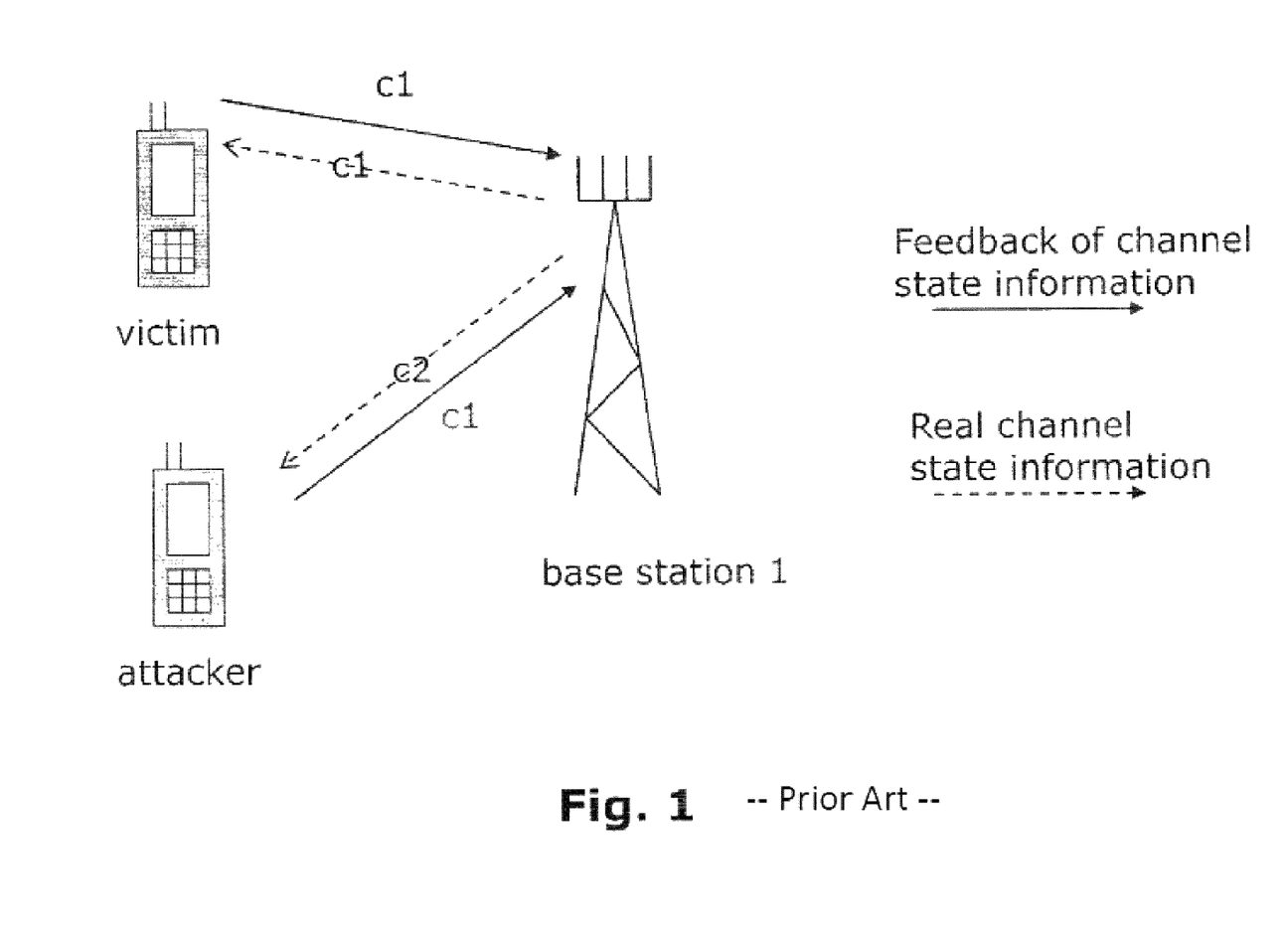
FIG. 1 schematically illustrates an example of intentional performance degradation.

FIG. 1 illustrates one example of such an attack where the attacker is attached to the same base station 1 as the victim. The victim sends channel state information c1 to the base station 1. The attacker pretends to have the same channel as the victim by sending the channel state information c1 to the base station 1, although his real channel state information is c2. The base station 1 concludes from these channel feedback that the victim and the attacker have the same channel and then decides not to schedule them simultaneously. Consequently, the base station 1 schedules the victim less frequently and the throughput of the victim is decreased.

Figure 2:
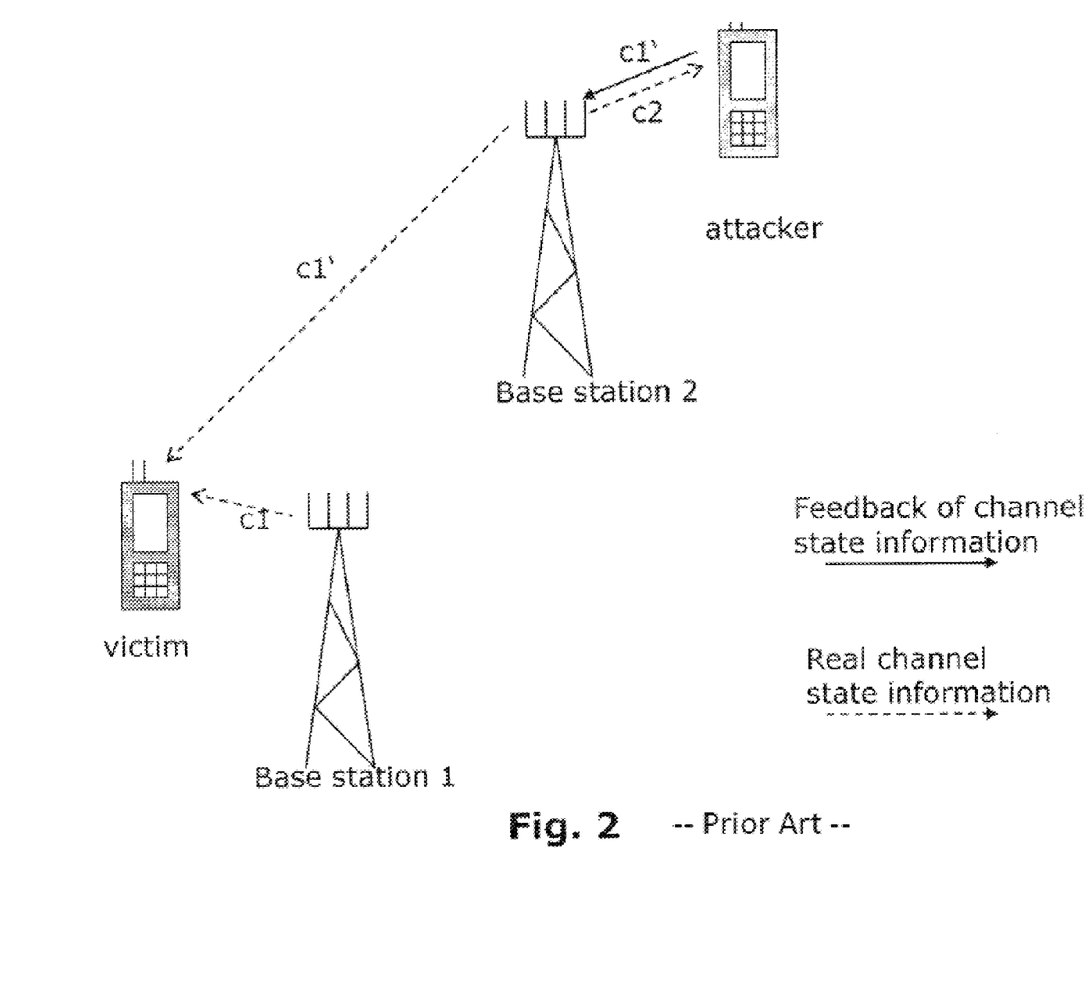
FIG. 2 schematically illustrates another example of intentional performance degradation.

FIG. 2 illustrates another example of such an attack where the victim is attached to base station 1 but the attacker is attached to a different base station 2. Once the attacker knows that the channel state information between the victim and the base station 2 is c1', he pretends to have the same channel as the victim by sending the channel state information c1' to the base station 2, although his real channel state information is c2. The base station 2 then maximizes the signal to the attacker assuming it has the channel state information c1, which creates high interference at the victim and the throughput of the victim is decreased.

Note that in case of such an attack the attacker may be only interested in decreasing the throughput of the victim without taking care of its own throughput.

If the users are scheduled based on the proportional fair scheduler, the attempt of the attacker has a limited effect for the case of the attacker and the victim being scheduled by the same base station. However, the attack via base stations in neighboring cells is still possible. Further, the proportional fair scheduler does not maximize the billable system throughput.

One solution which an expert could possibly imagine is to send a precoder matrix codebook index instead of quantized channel state information as the feedback information provided by the users to the base station. However, a closer examination of this solution reveals that it leads to identical problems as described by the feedback of channel state information because the attacker can still use the estimated channel state information at the victim for calculating a codebook index that generates maximum interference. Besides, the attacker can use the overheard precoder index sent by the victim and deduce channel information of the victim.

Therefore, it would therefore be desirable if a mechanism could be provided for preventing such intentional service performance degradation by attackers.

SUMMARY OF THE INVENTION

It is an objective of the present invention to provide a mechanism for the prevention of intentional multiuser MIMO performance degradation.

According to one embodiment there is provided a method for preventing a service degradation attack on a first wireless communication device by a second wireless communication device in a wireless communication system, said method comprising: verifying by a base station whether the channel state information sent to the base station by the second wireless communication device corresponds to its real channel.

Checking whether the channel information corresponds to the "real" channel provides the possibility to identify attacks by detecting that the fed back channel information is not "real" but is faked in order to perform an attack.

According to one embodiment the method, further comprises:
monitoring or checking an indicator to determine whether they can be regarded as indicating a fake channel information corresponding to an attack.

In this way it becomes possible to identify an attack through checking some indicator, which may be for example a parameter (like a channel correlation property) or, a signal (such as a response to a challenge). If the monitored indicator shows an unusual or unexpected behavior, then this may be regarded as indicating an attack.

According to one embodiment said wireless communication system is a multi-user multi-antenna system and the step of verifying the channel state information comprises:
sending a challenge message to the second wireless device which is precoded in accordance with the channel state information which is sent by the second wireless device,
determining whether second wireless device is able to send a correct response to the challenge message.

If the second wireless device sends faked channel state information different from its real channel state information, it will be most probably unable to successfully receive the challenge message and thus will not be able to send a correct response.

Therefore, the second wireless device is treated as an attacker when it does not correctly respond the challenge message.

With this approach, the base station can detect the wireless device that makes attack by sending faked channel state information.

According to one embodiment said method comprising:
monitoring the behavior of a plurality of second mobile devices to identify a second mobile device which can be regarded as a suspected attacker among the plurality of second mobile devices.

According to one embodiment, a second wireless communication device is determined as a suspected attacker if its channel state information is consistently the same as the first wireless communication device.

According to one embodiment the step of monitoring comprises:
tracking the channel state information of the second wireless communication device, and
determining whether the channel state information has a realistic channel correlation property.

The channel correlation property is one or more of channel correlation in time, frequency or space.

Accordingly, any unusual change in the channel state information can be detected. This takes into account the possibility that the attacker alternates the feedback between the real channel state information and the faked channel state information.

According to one embodiment said method comprising:
acquiring location information of the second wireless communication device;
determining whether the channel state information of the second wireless device corresponds to a channel at the location specified by the location information.

With this approach, the attacker who feeds back the faked channel state information that is not consistent with its location is detected.

According to one embodiment, a second wireless communication device is determined as a suspected attacker if its reserved bandwidth remains unused.

When reserved bandwidth remains unused, it does not contribute to the billable throughput. Therefore, preventing an attacker who does not use the reserved bandwidth effectively increases the billable throughput.

According to one embodiment said method further comprising:
preventing an attack by lowering priority of a suspected attacker in a scheduler.

According to one embodiment, the first wireless communication device is a user terminal or a relay node.

According to the present invention, wireless devices sending faked channel state information can be detected. The impact of these kinds of devices can be minimized and the degradation of the victim throughput is prevented without using proportional fair scheduler. Also, this allows usage of schedulers other than proportional fair such as maximum throughput scheduling maximizing the billable throughput of the system.

According to one embodiment there is provided an apparatus for preventing a service degradation attack on a first wireless communication device by a second wireless communication device in a wireless communication system, said apparatus comprising:
a module for verifying whether channel state information sent to the base station by the second wireless communication device corresponds to its real channel.

According to one embodiment there is provided an apparatus further comprising means for carrying out the method according to one of the embodiments of the invention.

According to one embodiment there is provided a computer program comprising computer program code which when being executed on a computer enables said computer to carry out a method according to one of the embodiments of the invention.

DETAILED DESCRIPTION

As described in the background section, in an attack scenario an attacker can feed back arbitrary channel state information in current systems. By feeding back faked channel state information, the attacker can negatively affect scheduling as well as degrade system performance.

As one concrete example, the attacker sends the faked channel state information that indicates very good channel qualities. Thus, the base station aiming at maximizing the data throughput schedules the attacker more frequently than other users.

As another possible example, the attacker sends the faked channel state information that is equal to the channel state information of the victim. Thus, high interference is created to the victim when the base station schedules the attacker.

According to embodiments of the invention such kind of attacks are to be prevented. According to one embodiment there is checked whether the channel information sent to the base station is "real" channel information. In other words whether it is faked or not. This enables then to detect an attack.

This can be done by monitoring or checking an indicator (such as a parameter or a signal or one or more a parameters over time) to see whether they can be regarded as indicating a "fake" channel information.

According to one embodiment of the invention, e.g. the base station monitors the channel state information fed back by the users, and detects whether there is consistent overlapping in the channel state information among users. If this happens, the base station concludes that there is at least one attacker among the users who feed back consistently same channel state information. This means that from the monitoring of a parameter (channel state information) over time for multiple users the base station can detect whether there is some pattern which indicates that one terminal fakes its channel information, e.g. because it consistently overlaps or coincides with the channel information if another terminal, which is a pattern which should not be expected in reality. Therefore, in this way the base station can detect an attack in this embodiment, namely by detecting that the attacker always feeds back the same channel state information as that of the victim.

According to the other embodiment of the invention, the base station detects the attacker by counting the number of negative acknowledgements for data reception. This is another "parameter" the monitoring of which can be led to the detection of an attack.

When the base station has the channel state information fed back by the users, it normally adapts the data transmission with respect to these channel feedback. Such adaptation includes adaptive precoding, link adaptation, etc. For example, the base station predicts the signal quality at the receiver based on the channel state information and selects the maximum supportable data rate.

Since the real channel state information of the attacker is different from that he feeds back to the base station, the quality of the signal received at the attacker is mostly worse than the prediction of the base station. Therefore, the probability that the attacker does not successfully receive the data will increase, resulting in an increasing number of negative acknowledgements such as HARQ NACKs in case HARQ (hybrid automatic repeat request) is used.

Additionally, since the data throughput is only billable when the user acknowledges the successful reception of the data, the attacker may intentionally send NACKs instead of ACKs even if it successfully receives the data so as to reduce the amount of the billing.

When the base station observes an unusual increase in the number of negative acknowledgments from a user, the base station can detect this user as an attacker or at least a suspected attacker.

According to an embodiment of the invention, there is provided another mechanism for verifying by the base station whether the channel state information sent to the base station by the user corresponds to its real channel.

In accordance with this embodiment, the base station sends a challenge message to a suspected attacker and verifies the response. The challenge message is transmitted in such a way that only the user whose real channel state information corresponds to the feedback one is able to successfully receive the challenge message and send a correct response.

In the case that the attacker indeed experiences a worse channel quality than that is indicated by the faked channel state information he feeds back to the base station, the attacker is unable to successfully detect the challenge message and send a correct response accordingly.

When the base station is equipped with multiple antennas, the base station may send the challenge message to a user using a precoder calculated from the channel state information fed back by that user.

In the case that the attacker feeds back the channel state information of the victim, the base station using the precoder calculated from the channel feedback actually directs the signal to the victim instead of the attacker. Hence, the signal level at the attacker is low. Therefore, the attacker is unable to successfully detect the challenge message and send a correct response accordingly.

When sending the challenge message, the base station may additionally introduce interference to further reduce the chance of the attacker to successfully receive the challenge message.

The challenge messages sent to the users are preferably different from each other. This is because if the challenge messages are the same, the attacker can send a correct response by overhearing the response of the victim and repeat it to the base station.

When the base station does not receive a correct response from a certain user after sending it a challenge message, the base station treats that user as an attacker, or at least a suspected attacker. Accordingly, the base station may use certain countermeasures. According to one embodiment of the invention, the base station may lower the priority of the attacker in the scheduler such that the attacker will be scheduled less frequently than other users.

Figure 3:
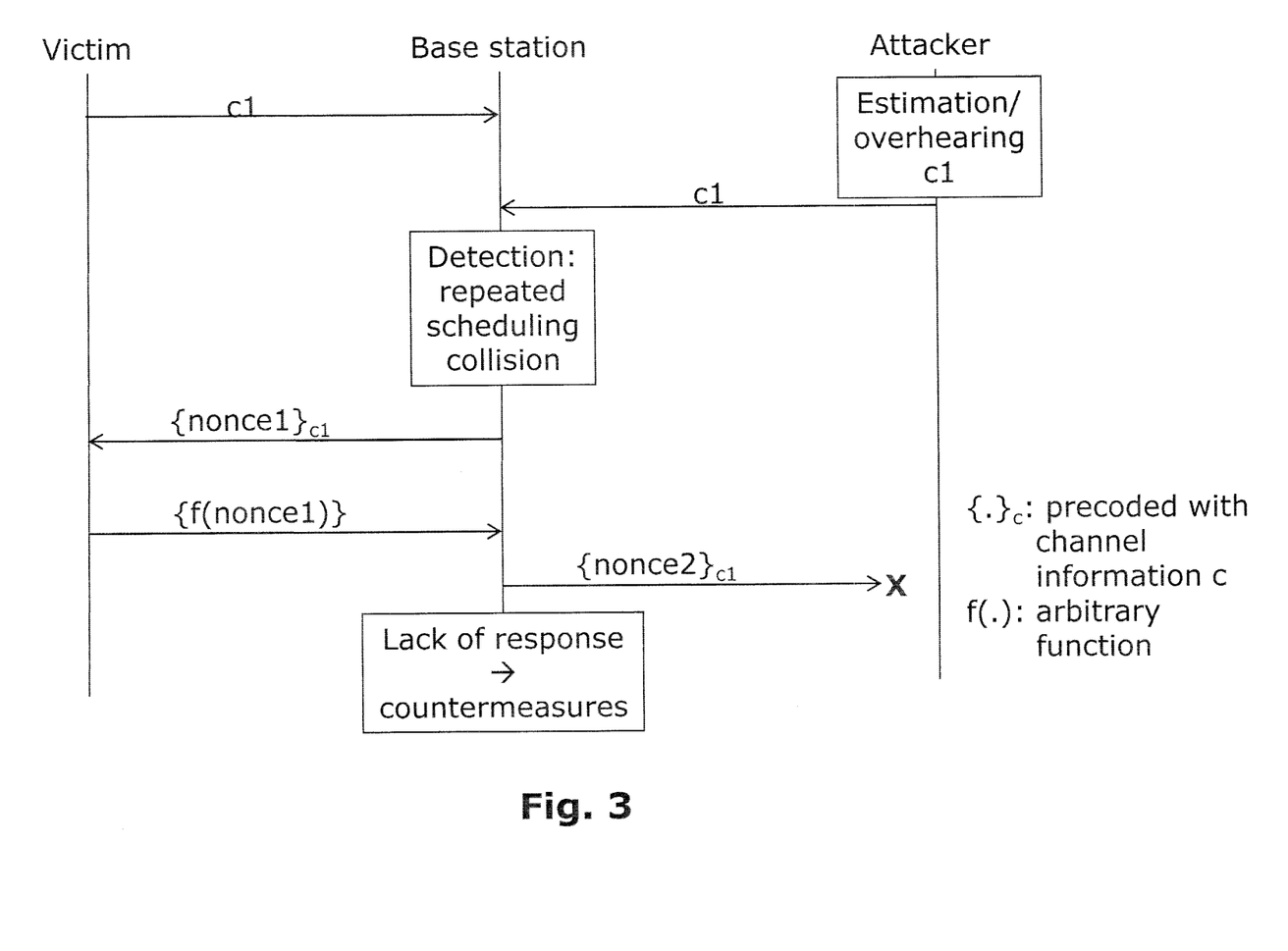
FIG. 3 schematically illustrates a flowchart of preventing intentional performance degradation according to one embodiment of the invention.

According to one embodiment the verification using a challenge message may be performed as illustrated in FIG. 3 which will now be explained.

The victim feeds back the channel state information $c_1$ to the base station. The attacker also feeds back the channel state information $c_1$ to the base station to pretend having the same channel state information as the victim. Consequently, the base station cannot simultaneously schedule these two users, a situation which is called a scheduling collision. When the base station detects that such scheduling collision repeatedly happens among the two users, it assumes that one of them is an attacker.

To identify the victim and the attacker, the base station sends each of the two users a challenge message that is precoded in accordance with the channel feedback $c_1$. Each challenge message may e.g. contain a nonce, i.e. number used once. The nonce is e.g. a random or pseudo-random number that is used only once in order to prevent replay attacks.

As shown in FIG. 3, the base station sends a signal $\{nonce1\}_{c1}$ to the victim, which is a challenge message containing a nonce "nonce1" and being precoded with respect to the channel feedback c1. As the real channel state information of the victim is c1, the victim is able to successfully detect the challenge message and so the nonce "nonce1". The victim then sends a response including the detected nonce "nonce1" to the base station. Alternatively, the response may include a result after applying an arbitrary function f(.) to the detected nonce. A response is regarded as correct if it contains the nonce that is sent by the base station. As shown in FIG. 3, the victim sends the correct response f(nonce1) to the base station.

The base station also sends a signal $\{nonce2\}_{c1}$ to the attacker, which is a challenge message containing another nonce "nonce2" and being precoded with respect to the channel feedback c1. As the real channel state information of the attacker is different from c1, the attacker fails to successfully detect the challenge message and the nonce "nonce2". Without knowing the nonce contained in the challenge message, the attacker is unable to send a correct response.

As shown in FIG. 3, if no response is received from a user or the response of a user is incorrect, the base station regards that user as an attacker and performs certain countermeasures.

According to one embodiment, the challenge message is sent in a RRC (Radio Resource Control) request.

To avoid being detected by the base station, the attacker may alternate between the real channel state information and the faked channel state information during channel feedback.

To take into account this situation, according to one embodiment of the invention, the base station verifies the feedback of the channel state information by tracking the channel state information.

As well-known, radio channel continuously varies over time due to user's movement, and the time variance of the channel is normally characterized by the channel time correlation property. The higher the user's velocity, the faster the channel varies, and the lower the time correlation.

When the attacker feeds back the real channel state information in one time period and feeds back the faked channel state information in another time period, an unusual change of channel state information in time will be observed. In other words, the feedback of the channel state information from the attacker will not correspond to the channel time correlation property.

Hence, the base station may use correlations in time for reliability verification.

On the other hand, the attacker may alternate the channel feedback not in time but in different frequency bands. Thus, there will be no unusual change in time. However, radio channel also continuously varies over frequency due to delay spread of the multipath propagation. The frequency variance of the channel is normally characterized by the channel frequency correlation property. The larger the multipath delay spread, the faster the channel varies in frequency, and the lower the frequency correlation.

Accordingly, the base station according to one embodiment can detect the attacker by calculating the channel frequency correlation and determining whether the channel state information has a realistic channel correlation property, even if the attacker alternates the channel state information in frequency.

According to the present embodiment, the base station tracks the channel state information, calculates the channel correlation property, and determines whether the channel state information has a realistic channel correlation property to verify the feedback of the channel state information. The user whose channel state information does not correspond to a realistic channel correlation property will be detected by the base station as an attacker or at least as a suspected attacker. The channel correlation property is one or more of channel correlation in time, frequency and space.

Therefore, the present embodiment allows detection of attackers if the channel state information of the attacker jumps frequently, for example between the real channel state information and the faked one. This is then regarded as a pattern of the channel correlation property which indicates that an attack may be taking place.

According to one embodiment the channel correlation property is measured and compared with some knowledge base or data base or reference patterns to detect an indication whether the channel correlation property gives rise to suspicion that an attack is taking place.

According to one embodiment of the invention, the base station verifies the feedback of the channel state information by using location information of the users.

The channel between the base station and the user is dependent on the user's location. There are channel properties or channel state information that are almost constant for a given location and different in different locations. Such channel properties or channel state information include path-loss, shadow fading, channel spatial correlation, channel frequency correlation, etc.

A user locating near to the base station experiences small path-loss while a user locating far away from the base station experiences large path-loss. A user experiences large shadow fading if it is in a location shadowed by large obstacles such as hills, buildings etc. Further, the statistical properties of the multipath propagation are also highly related to the propagation environment that is location-dependent. The channel frequency correlation can be characterized by the delay spread of the multipath propagation. The channel spatial correlation can be characterized by the angular spread of the multipath propagation. In a location where there is a lot of scattering, both the delay spread and the angular spread become large. Therefore, the channel frequency correlation and channel spatial correlation properties are relatively constant for a given location.

As these channel properties are almost constant for a given location. It is possible to measure them and/or estimate them based on radio planning tools and store them with respect to the locations. In this way a knowledge base or database can be constructed, which can then be used by the base station for verification purposes.

When the base station has the knowledge of these channel properties in correspondence with each location and has the location information of the user, the base station is able to verify whether the feedback of the channel state information is consistent with the channel properties at the location of the user. In case of an inconsistency, the base station may regard the corresponding user as an attacker or at least a suspected attacker.

The location information may be measured by the user via GPS or triangulation and then fed back to the base station. Alternatively, the base station may measure the location information by the network via triangulation.

Figure 4:
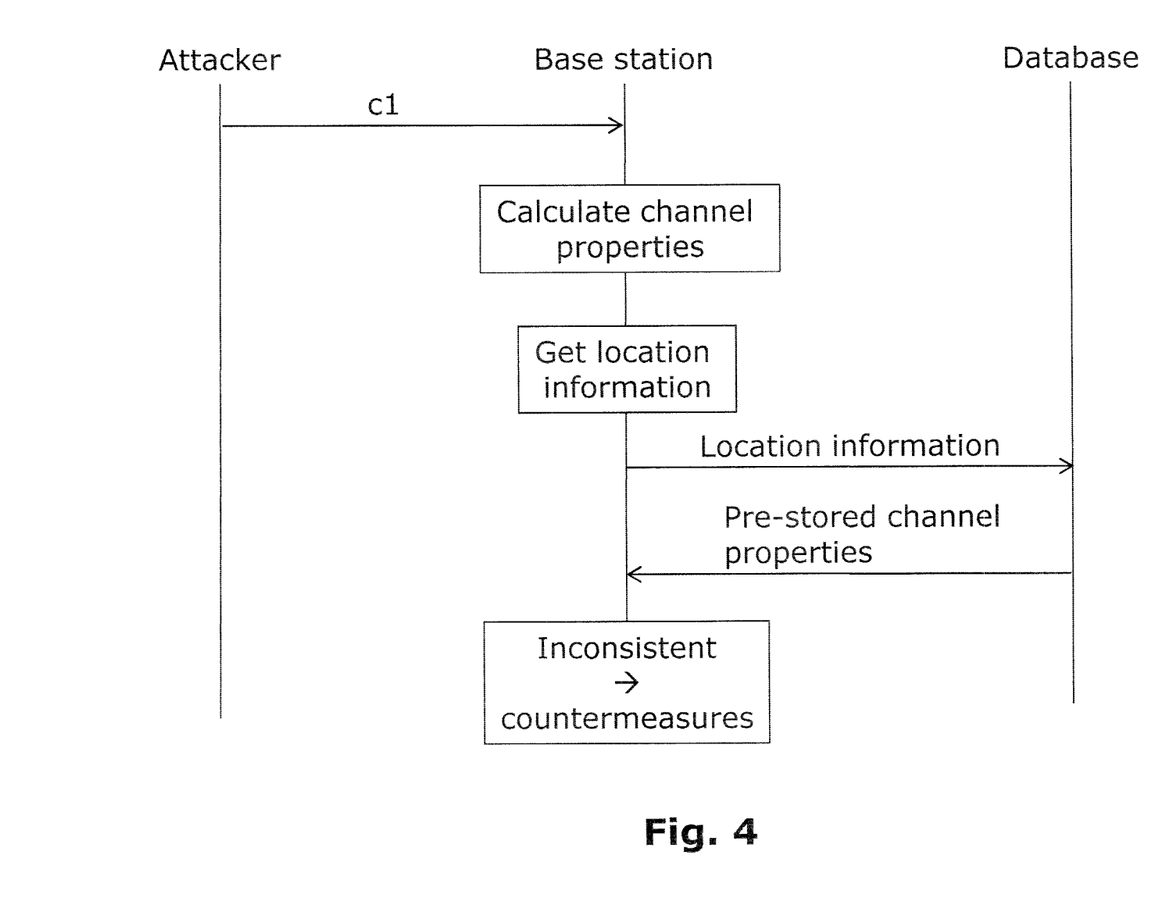
FIG. 4 schematically illustrates a flowchart of preventing intentional performance degradation according to another embodiment of the invention.

According to one embodiment the verification using the location information may be performed as illustrated in FIG. 4 which will now be explained.

In this embodiment, a data base pre-stores information about the location-dependent channel properties in correspondence to each location at which a user may appear.

As shown in FIG. 4, for a user or a suspected attacker, the base station calculates channel properties based on the channel state information c1. The base station also gets the location information of that user. The base station receives pre-stored channel properties at the corresponding location from the data base by sending the location information of that user. Then, the base station compares the calculated channel properties with those from the database, and regards the user as an attacker if they are inconsistent with each other.

The database can be integrated in or separated from the base station.

In a wireless communication system where the data transmission is adapted with respect to the channel state information fed back by the users, a service degradation attack can be made by feeding back faked channel state information. When the faked channel state information is the channel state information of a victim, the service provided to this victim is degraded because serving the attacker claiming the same channel state information as the victim generates high interference to the victim.

As described above in detail, according to embodiments of the present invention, a base station verifies whether the channel state information fed back by a user to the base station corresponds to the user's real channel. Therefore, a service degradation attack on a victim by sending faked channel state information can be detected and prevented.

This is especially important if the victim is relay node, which forwards the data communication between the base station and the users.

The invention significantly increases reliability of the wireless communication and ensures billable system throughput.

It will be apparent for the skilled person that the embodiments which have been described in the foregoing may be modified while still making use of the basic ideas of the present invention. In particular, the base station in the present invention may be an enhanced Node B in cellular systems, a wireless access point, or anything alike, and the user in the present invention may refer to a user terminal including a relay node, a computer, a PDA, a mobile phone, a smart phone, or anything alike.

It will be understood by the skilled person that the embodiments described hereinbefore may be implemented by hardware, by software, or by a combination of software and hardware. The modules and functions described in connection with embodiments of the invention may be as a whole or in part implemented by microprocessors or computers which are suitably programmed such as to act in accordance with the methods explained in connection with embodiments of the invention. An apparatus implementing an embodiment of the invention may e.g. comprise a base station, an enhanced Node B, a wireless access point, or anything alike.

What is claimed is:

1. A method for preventing a service degradation attack on a first wireless communication device by a second wireless communication device in a wireless communication system, said method comprising:
    verifying by a base station whether channel state information sent to the base station by the second wireless communication device corresponds to its real channel;
    said method further comprising:
        monitoring or checking an indicator to determine whether said indicator can be regarded as indicating a fake channel information corresponding to an attack, said indicator being a response to a challenge message;
    wherein the step of verifying the channel state information comprises:
        sending the challenge message to the second wireless device which is transmitted in accordance with the channel state information which is sent by the second wireless device,
        determining whether second wireless device is able to send a correct response to the challenge message.

2. The method of claim 1, wherein the second wireless device is treated as an attacker when it does not correctly respond the challenge message.

3. The method of claim 1, wherein said wireless communication system is a multi-user multi-antenna system and the challenge message to the second wireless device is precoded in accordance with the channel state information which is sent by the second wireless device.

4. The method of claim 1, comprising:
    monitoring the behavior of a plurality of second mobile devices to identify a second mobile device which can be regarded as a suspected attacker among the plurality of second mobile devices.

5. The method of claim 4, wherein the step of monitoring comprises:
    tracking the channel state information of the second wireless communication device, and determining whether the channel state information has a realistic channel correlation property.

6. The method of claim 5, wherein the channel correlation property is one or more of channel correlation in time, frequency or space.

7. The method of claim 1, comprising:
    acquiring location information of the second wireless communication device;
    determining whether the channel state information of the second wireless device corresponds to a channel at the location specified by the location information.

8. The method of claim 1, comprising:
    determining a second wireless communication device as a suspected attacker if its channel state information is consistently the same as the first wireless communication device.

9. A method for preventing a service degradation attack on a first wireless communication device by a second wireless communication device in a wireless communication system, said method comprising:
    verifying by a base station whether channel state information sent to the base station by the second wireless communication device corresponds to its real channel; and
    determining a second wireless communication device as a suspected attacker if its reserved bandwidth remains unused;
    said method further comprising:
        monitoring or checking an indicator to determine whether the indicator can be regarded as indicating a fake channel information corresponding to an attack, said indicator being a response to a challenge message.

10. The method according to any of the preceding claims further comprising:
    preventing an attack by lowering priority of a suspected attacker in a scheduler.

11. An apparatus for preventing a service degradation attack on a first wireless communication device by a second wireless communication device in a wireless communication system, said apparatus comprising:

a module for verifying whether channel state information sent to a base station by the second wireless communication device corresponds to its real channel; and a module for sending a challenge message to the second wireless communication device which is transmitted in accordance with the channel state information which is sent by the second wireless device; and determining whether the second wireless communication device is able to send a correct response to the challenge message;

said apparatus further comprising:

means for monitoring or checking an indicator to determine whether the indicator can be regarded as indicating a fake channel information corresponding to an attack, said indicator being a response to the challenge message.

12. A non-transitory computer-readable medium comprising computer program code which when being executed on a computer enables said computer to carry out a method according to claim 1.

13. An apparatus for preventing a service degradation attack on a first wireless communication device by a second wireless communication device in a wireless communication system, said apparatus comprising:

a processor configured to verify whether channel state information sent to a base station by the second wireless communication device corresponds to its real channel, monitor or check an indicator to determine whether the indicator can be regarded as indicating a fake channel information corresponding to an attack, said indicator being a response to a challenge message, send the challenge message to the second wireless communication device which is transmitted in accordance with the channel state information which is sent by the second wireless device, and determine whether the second wireless communication device is able to send a correct response to the challenge message.

14. The method of claim 9, wherein the second wireless device is treated as an attacker when it does not correctly respond the challenge message.

15. The apparatus of claim 13, wherein the second wireless device is treated as an attacker when it does not correctly respond the challenge message.

* * * * *